United States Patent [19]

Tom

[11] 4,348,676

[45] Sep. 7, 1982

[54] AUTOMATIC PHASE ALIGNMENT SYSTEM FOR A TRACKING ANTENNA

[75] Inventor: Nelson N. Tom, San Jose, Calif.

[73] Assignee: Ford Aerospace & Communications Corporation, Detroit, Mich.

[21] Appl. No.: 185,479

[22] Filed: Sep. 9, 1980

[51] Int. Cl.³ .......................... G01S 5/02; G01S 7/40; G01S 13/00
[52] U.S. Cl. .................................. 343/114; 343/16 M; 343/17.7; 343/114.5; 343/116; 343/117 R
[58] Field of Search .................. 343/116, 117 R, 17.7, 343/16 M, 114, 114.5

[56] References Cited

U.S. PATENT DOCUMENTS

| | | | |
|---|---|---|---|
| 2,861,177 | 11/1958 | Dishal et al. | 343/116 |
| 3,196,433 | 7/1965 | Barton et al. | 343/117 R |
| 3,221,328 | 11/1965 | Isch | 343/16 M |
| 3,582,950 | 6/1971 | Tanaka et al. | 343/117 R |
| 3,821,741 | 6/1974 | D'Oro et al. | 343/117 R |
| 3,842,420 | 10/1974 | Rabow | 343/117 R |
| 3,883,870 | 5/1975 | Kunz | 343/16 M |
| 4,030,099 | 6/1977 | Valenti et al. | 343/117 R |

Primary Examiner—S. C. Buczinski
Attorney, Agent, or Firm—Alan Huang; Edward J. Radlo; Robert D. Sanborn

[57] ABSTRACT

The tracking signals of a monopulse satellite tracking system are optimized by aligning the phases of the azimuth and elevation channels (the "difference" channels) with the reference (or "sum") channel using an autophase controller and a simulated far field source in the near field. The autophase controller monitors the output of the tracking receiver and adjusts phase shifters along the transmission paths of the azimuth and elevation channels, in a manner to maximize the outputs of the receiver. The simulated far field source provides an alignment signal for the autophase controller. The simulated far field source consists of a signal generator, a near field probe, and near field phase compensators. The probe is positioned to avoid any nulls in the simulated tracking signal for the frequencies of interest. The probe is also positioned to limit the range of the phase shifts introduced by near field placement, for the frequencies of interest. Near field phase shift compensators are used to offset the phase shifts introduced by the use of a near field source instead of a far field source.

16 Claims, 4 Drawing Figures

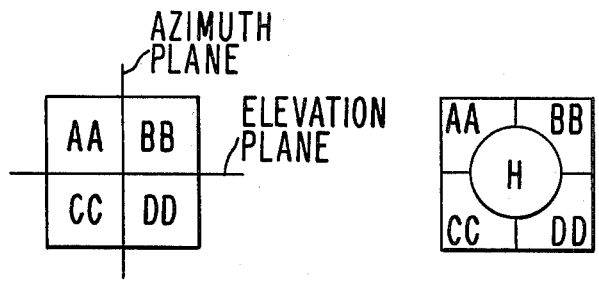
FIG.2A
PRIOR ART
FIG.2B
PRIOR ART
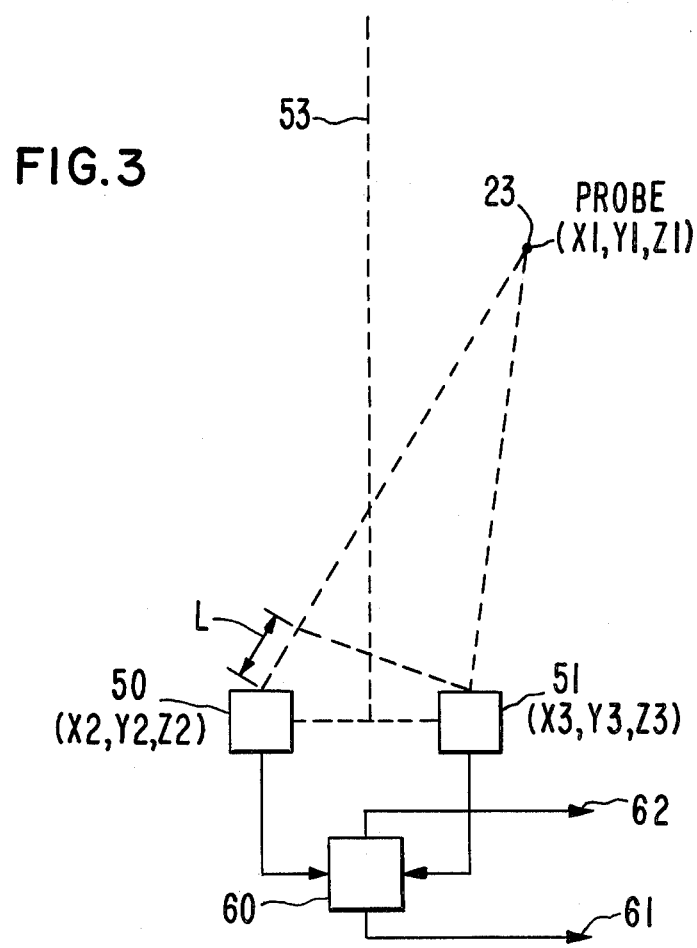
FIG.3

AUTOMATIC PHASE ALIGNMENT SYSTEM FOR A TRACKING ANTENNA

BACKGROUND OF THE INVENTION

1. Field of the Invention

This invention pertains to the alignment of the phases of error signals from two orthogonal axes, such as the elevation and azimuth axes, in a monopulse antenna tracking system such as used in a satellite tracking antenna.

2. Description of the Prior Art

A prior art search was performed and uncovered the following U.S. patent references:

U.S. Pat. Nos. 3,842,420 and 4,030,099 describe an antenna tracking technique called "step track" which involves stepping the direction of an antenna in a manner which increases the strength of the received signal. My invention is concerned with optimizing an entirely different tracking technique known as "monopulse" tracking, wherein antenna receive elements develope two error channels corresponding to tracking errors with respect to two orthogonal axes. The cited patents also make no mention of a simulated far field source or a completely automatic means of aligning the phases of the signals within the system, as in my invention.

U.S. Pat. No. 3,582,950 describes an antenna feed system which generates elevation and azimuth error channels needed for monopulse tracking. The necessity of receiver alignment phase shifters is recognized; however, no mention is made of a simulated far field source, near field compensation phase shifters, or an automatic means of phase aligning the system, as in my invention.

U.S. Pat. No. 3,821,741 describes an antenna feed system which provides elevation and azimuth error channels needed for monopulse tracking. Phase shifters are included in the feed to compensate for phase shifts introduced by the feed; however, no means is shown to compensate for phase shifts introduced by the receivers or other portions of the system. No mention is made of a simulated far field source, or an automatic means of phase aligning the entire system, as in my invention.

SUMMARY OF THE INVENTION

My invention optimizes the detection of tracking signals from a far field source of a steerable directional antenna. This is accomplished by aligning the phases of tracking signals within each of two "difference" channels, which represent tracking errors with respect to each of two spatially orthogonal axes, such as azimuth and elevation, relative to a sum (or "reference") signal. This alignment is performed by an autophase controller 20 which monitors the strength of the tracking signals emerging from the tracking receiver 36 and adjusts phase shifters 16 and 17 within the paths of the azimuth and elevation signals, to maximize the detected tracking signals.

A simulated far field source is placed in the antenna's near field and is used to provide a signal for the autophase controller to optimize. This simulated far field source consists of a signal generator, a near field probe, and some near field compensation phase shifters. The signal generator is connected to the probe. The probe is positioned in the near field, off of the boresight axis, i.e., the axis of directivity of the antenna. The difference in the path lengths between the probe and the various antenna receiving elements introduces phase shifts between the sum and the difference channel signals at the element outputs. To simulate a far field source, these near field induced phase shifts must be removed. These near field induced phase shifts are offset by near field compensation phase shifters 27 and 28 normally positioned within the azimuth and elevation channels, but optionally positioned within the reference channel. Alternatively, near field phase compensation can be accomplished without the use of phase shifters 27 and 28 by programming controller 20 to add the requisite offsets to phase shifters 16 and 17 after outputs 30 and 31 have been maximized.

The required near field phase offsets vary as a function of signal frequency. These variations can be limited by properly positioning the probe. Proper positioning of the probe is also required to insure that the probe signals do not emerge from the various receiving elements out of phase so as to null each other out.

Automatic phase alignment is accomplished by applying the signal of the desired frequency to the probe, inserting the near field compensation phase shifters, and allowing the autophase controller to adjust the azimuth and elevation phase shifters in a manner which optimizes the tracking signals. Upon removal of the near field compensation phase shifters and the silencing of the signal generator, the tracking system is phase aligned and ready for operation.

BRIEF DESCRIPTION OF THE DRAWINGS

These and other more detailed and specific objects and features of the present invention are more fully disclosed in the following specification, reference being made to the accompanying drawings, in which:

FIG. 2(a) (prior art) shows a four quadrant receive element configuration for monopulse tracking;

FIG. 2(b) (prior art) shows another receive element configuration used for monopulse tracking having a central summation element; and FIG. 3 shows the differences in signal path length and the accompanying phase shifts introduced by the near field placement of a simulated source.

DESCRIPTION OF THE PREFERRED EMBODIMENTS

Figure 1:
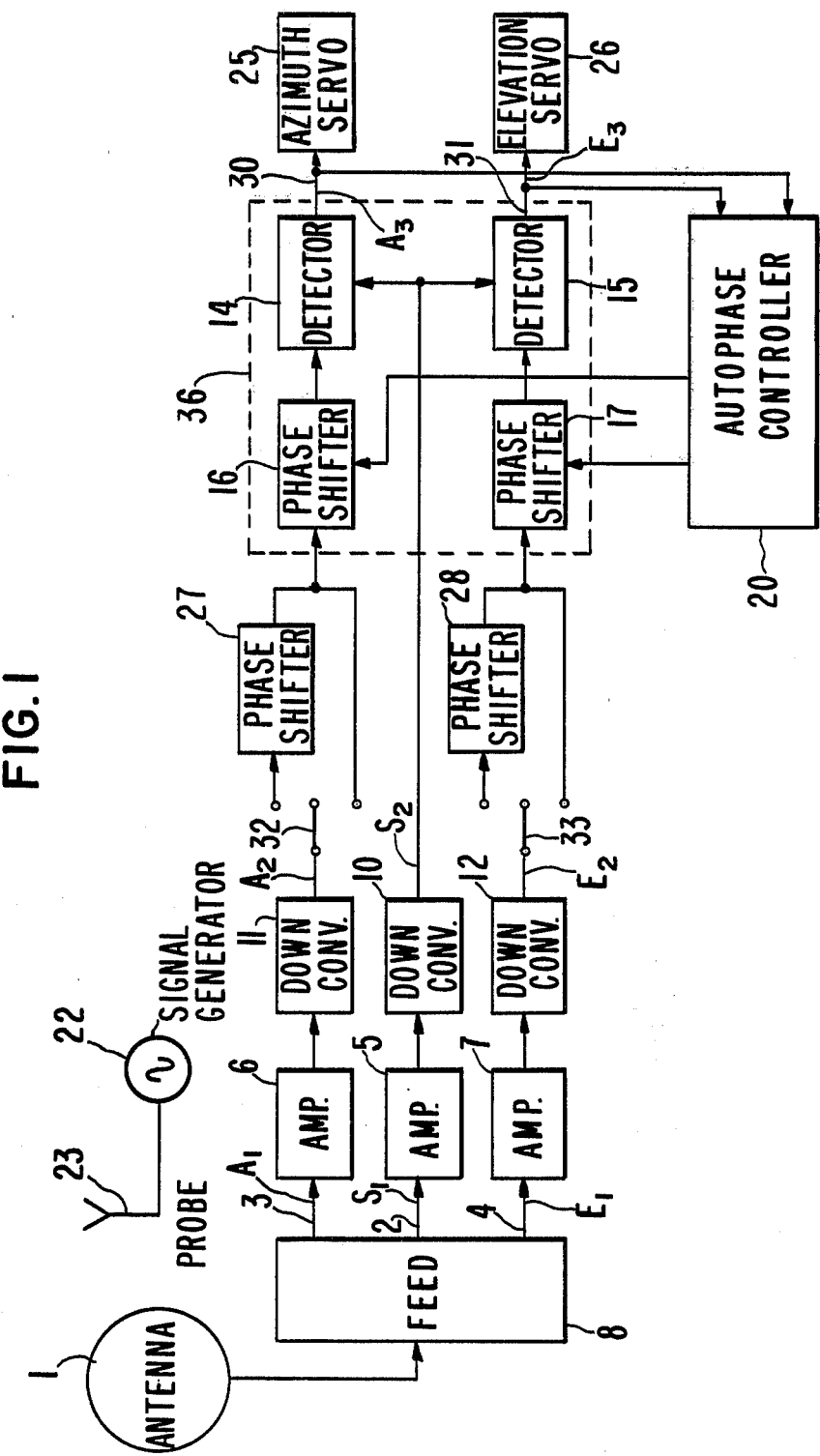
FIG. 1 is a block diagram of a satellite tracking system showing a simulated far field source, compensation for the simulated source, receiver alignment phase shifters, and an autophase controller to optimize the phase alignment.

There are various antenna tracking techniques which can be used to automatically steer the boresight axis of a steerable directional antenna, such as a steerable paraboloidal reflector, in the direction of an incoming signal, which is typically electromagnetic radiation. In a monopulse tracking system as shown in FIG. 1, the antenna feed 8 provides three receiving outputs: $S_1$, $A_1$, and $E_1$, at points 2, 3, and 4, respectively. $S_1$ is a sum channel output signal that can be represented as:

$$S_1 = S \sin(W_1 t) \tag{1}$$

where S is the amplitude of the received signal, $W_1$ is its frequency, and t is time. Channels $A_1$ and $E_1$ are known as difference (or "tracking") signals and contain pointing error information with respect to each of two orthogonal axes. These two axes are often the azimuth and elevation axes, and this embodiment will be used in this specification for purposes of illustration. However, any set of orthogonal axes may be used, such as hour angle and declination, "X" and "Y", etc. $A_1$ and $E_1$ can be represented by:

$$A_1 = D_A \sin(W_1 t) \qquad (2)$$

and $$E_1 = D_E \sin(W_1 t) \qquad (3)$$

where $D_A$ and $D_E$ are proportional to the azimuth and elevation components of the angle between the antenna boresight axis and the direction of the incoming signal.

Signals $S_1$, $A_1$, and $E_1$ are amplified by amplifiers 5, 6, and 7, respectively, and are then converted to an intermediate frequency, $W_2$ (or band of frequencies) by down converters 10, 11, and 12, respectively, by means of heterodyning. These signals are then given to tracking receiver 36 which in the preferred embodiment is a coherent receiver which detects the phase difference between each tracking signal and the sum signal, as well as the amplitude of each tracking signal. The azimuth signal from converter 11 is usually fed to receiver alignment phase shifter 16 within receiver 36, and then to coherent detector 14, also within receiver 36. The elevation signal from down converter 12 is usually fed to receiver alignment phase shifter 17 within receiver 36, and then to coherent detector 15, also within receiver 36.

The sum signal, $S_1$, is fed directly to detectors 14 and 15 from down converter 10. The transmission paths of the sum, azimuth, and elevation signals over the path from antenna 1 to detectors 14 and 15 are quite likely different in length. This introduces phase shifts among the signals which causes difficulties in the detection of the tracking signals, which causes misalignment between the boresight axis of the antenna and the radiation source.

Detectors 14 and 15 are usually multipliers having low pass filters to reject high frequency signals, e.g., those greater than $W_2$. If the inputs to tracking receiver 36 are represented as:

$$S_2 = S \sin(W_2 t) \qquad (4)$$

$$A_2 = D_A \sin(W_2 t + P_1) \qquad (5)$$

$$E_2 = D_E \sin(W_2 t + P_2) \qquad (6)$$

where $S_2$, $A_2$, and $E_2$ are the outputs of converters 10, 11, and 12 respectively; and $P_1$ and $P_2$ represent the phase shifts of the tracking signals relative to the sum signal caused by the different amplifiers, down converters, and transmission lines. Then the outputs $A_3$ and $E_3$ at 30 and 31, respectively, of detectors 14 and 15, respectively, become:

$$A_3 = \tfrac{1}{2} D_A \cos(P_1) \qquad (7)$$

$$E_3 = \tfrac{1}{2} D_E \cos(P_2) \qquad (8)$$

These outputs do not accurately indicate the azimuthal and elevational angular offsets unless both $P_1$ and $P_2$ are zero. In fact, the particular tracking signal will be completely lost if the associated phase shift is 90° or 270°. To avoid these difficulties, shifters 16 and 17 must be adjusted to insure that $P_1$ and $P_2$ are zero. This phase alignment optimizes the azimuth and elevation error signals which emerge at 30 and 31. These az/el error signals are then fed to antenna positioning servos 25 and 26, respectively, which adjust the mechanical pointing of antenna 1 in the azimuthal and elevational directions, respectively. Proper adjustment of phase shifters 16 and 17 is therefore critical in obtaining a proper tracking signal.

The prior art procedure for adjusting these phase shifters was to point the antenna (by optimizing the data signal $S_1$) at a far field signal source such as a boresight tower, satellite, or other manmade source radiating at the desired frequency. By "far-field" is meant that the distance from the source to the antenna is greater than the square of the antenna reflector diameter divided by the wavelength of the radiation. The antenna was then moved off the source in the azimuthal direction while keeping the elevation constant to generate an azimuth error signal. The azimuth phase shifter 16 was then adjusted manually to maximize the output at 30. This procedure was then repeated for the elevation channel. This phase alignment had to be performed each time equipment was replaced or a new signal frequency was used. This laborious task was further complicated by the necessity for a far field source.

In the present invention, the phase alignment procedure is automated by autophase controller 20, which monitors outputs 30 and 31 of detectors 14 and 15, respectively, while controlling phase shifters 16 and 17. The autophase controller consists of a microprocessor, an A/D converter, and a D/A converter. The microprocessor uses the A/D converter to sample the signal at 30 and store this measurement. The microprocessor then uses the D/A converter to generate a signal to adjust the phase shift of phase shifter 16. This sample and adjust procedure is continued until a maximum in the output at 30 is found. The maximum indicates that phase shifter 16 is adjusted for optimal detection. The microprocessor of autophase controller 20 applies this same procedure to output 31 and phase shifter 17 to optimize the phase alignment of the elevation channel.

If detectors 14 and 15 are not coherent detectors, autophase controller 20 is not used.

In order to function, autophase controller 20 requires an azimuth error signal and an elevation error signal to be maximized. Such signals can be provided by either a far field source (prior art), a simulated far field source in the near field, or alignment signals inserted at points 2, 3, and 4. The far field or simulated far field source is preferable since such a source incorporates any path differences between antenna 1 and points 2, 3, and 4 into the phase shift corrections.

The requirement for a far field source is quite inconvenient. The present invention uses a near field source to simulate a far field source. This can be accomplished by connecting a signal generator 22 to a probe 23 (which is any radiating element capable of transmitting radiation to the antenna receive elements) situated near the boresight axis of antenna 1. The placement of such a near field source introduces its own phase shift errors. These phase shifts are compensated for by near field compensation phase shifters 27 and 28 which are typically inserted by switches 32 and 33, respectively, between down converters 11 and 12, respectively, and phase shifters 16 and 17, respectively, during autophase alignment of the system (necessitated by change of equipment or change of frequency). Alternatively, the two near field compensation phase shifters can be inserted within any two of the three sum and difference channels.

Probe 23, signal generator 22, and phase shifters 27 and 28 simulate a far field source which has been moved off the boresight axis to provide azimuth and elevation error signals. These error signals allow autophase controller 20 to adjust phase shifters 16 and 17 to maximize the output of detectors 14 and 15, respectively. Upon removing the near field phase shift compensators 27 and 28 from the azimuth and elevation transmission paths, respectively, by means of switches 32 and 33, respectively, while deactivating signal generator 22, the system will be phase aligned from antenna 1 to detectors 14 and 15.

The correct placement of probe 23 is important in properly simulating a far field source. The permissible locations for the probe are determined by the wavelength of the signal and the relative geometry between the probe and the receiving elements (such as "horns"). FIGS. 2(a) and 2(b) show two typical receiving element configurations used for monopulse tracking. The plane of FIGS. 2(a) and 2(b) is orthogonal to the antenna's boresight axis. The intersections of this plane with the azimuth and elevation planes are shown on FIG. 2(a). The elevation plane represents locations of constant elevation and the azimuth plane represents locations of constant azimuth. The two illustrated planes intersect at the antenna's boresight axis.

The elevation error signal $E_1$ is proportional to $(AA+BB)-(CC+DD)$ where AA, BB, CC, and DD are signals from the receiving elements so labeled in FIGS. 2(a) and 2(b). The azimuth error signal $A_1$ is proportional to $(AA+CC)-(BB+DD)$. In the configuration shown in FIG. 2(a), the sum signal $S_1$ is proportional to $AA+BB+CC+DD$, while in FIG. 2(b) it is proportional to the signal received by central receiving element H.

The near field (i.e., that region other than the far field) placement of probe 23 within the aperture of the antenna (an area defined by the projection of the antenna's usable receiving surface onto a plane orthogonal to the boresight axis) will usually result in phase differences among the outputs AA, BB, CC, and DD because of the path differences between probe 23 and the different receiving elements. Such a path difference is shown in FIG. 3. 50 and 51 are receiving elements while 23 is the probe. 53 is the boresight axis of the antenna (and as such passes through the center of the feed array). If the location of probe 23 is (X1, Y1, Z1) and the locations of elements 50 and 51 are (X2, Y2, Z2) and (X3, Y3, Z3), respectively, then the difference in the path lengths between the probe and the first element, and the probe and the second element, is:

$$[(X2-X1)^2+(Y2-Y1)^2+(Z2-Z1)^2]^{\frac{1}{2}} - [(X3-X1)^2+(Y3-Y1)^2+(Z3-Z1)^2]^{\frac{1}{2}} \quad (9)$$

This path difference, L, is responsible for a phase shift between the signals received at elements 50 and 51. This phase shift, D, in radians is equal to:

$$L(2\pi f/c) \quad (10)$$

where f is the frequency of the signal emanating from probe 23 and c is the speed of light. Probe 23 must be placed so that L is less than a wavelength. If the signal at element 51 is represented by:

$$A \sin(Wt) \quad (11)$$

and the signal at element 50 is represented by:

$$B \sin(Wt+D) \quad (12)$$

and these signals are fed to a four-port device shown in FIG. 3 as 60, which produces sum and difference outputs, then the difference output 61 of device 60 becomes:

$$A \sin(Wt) - B \sin(Wt+D). \quad (13)$$

This is equal to:

$$\sin Wt(A-B\cos D) - (B\cos Wt)\sin D. \quad (14)$$

By substituting $K_D \cos(T_D)$ for $(A-B\cos D)$ and $K_D \sin(T_D)$ for $-B\sin D$ equation 14 simplifies to:

$$K_D \sin(Wt+T_D) \quad (15)$$

where $K_D$ can be shown to be equal to:

$$[(A-B\cos D)^2+(B\sin D)^2]^{\frac{1}{2}} \quad (16)$$

and $T_D$ can be shown to be equal to:

$$\tan^{-1}\frac{-B\sin D}{A-B\cos D}. \quad (17)$$

Similarly, the sum output 62 of device 60 can be written as:

$$K_s \sin(Wt+T_s) \quad (18)$$

where $K_s$ is equal to:
$$[(A+B\cos D)^2+(-B\sin D)^2]^{\frac{1}{2}} \quad (19)$$

and $T_S$ is equal to:

$$\tan^{-1}\frac{B\sin D}{A+B\cos D}. \quad (20)$$

$(T_S-T_D)$ represents the phase shift between the sum and the difference signals caused by the fact that the probe is located in the near field. Since the desired tracking signal will originate in the far field, this phase shift must be compensated.

These equations govern the positioning of probe 23. It is important to position the probe such that the fluctuations in $T_D$ and $T_S$ as a function of frequency are within tolerable limits for the frequencies of interest. Since D is equal to $L2\pi f/c$, the fluctuations of $T_D$ and $T_S$ can be plotted as a function of frequency for a particular band and for a particular L. The range of fluctuations of $T_D$ and $T_S$ are used to select a suitable L. Restricting the fluctuations in $T_D$ and $T_S$ is desirable since this reduces the sensitivity of the corrections introduced by phase shifters 27 and 28 to changes in frequency.

The $K_D$ factor, $$[(A-B\cos D)^2+(B\sin D)^2]^{\frac{1}{2}} \quad (21)$$

of the difference output 61, and the $K_S$ factor, $$[(A+B\cos D)^2+(-B\sin D)^2]^{\frac{1}{2}} \quad (22)$$

of the sum output 62 also influence the positioning of the probe 23. Since A is approximately the same magnitude as B, $K_D$ will approach zero as D approaches 0 radians or $2\pi$ radians. Similarly, $K_S$ approaches zero as D approaches $\pi$ radians. In either case this is undesirable since these signals (the outputs of device 60) are used to generate the azimuth and elevation calibration signals $A_1$ and $E_1$, respectively. Weak $A_1$ and $E_1$ signals would make it very difficult for autophase controller 20 to adjust phase shifters 16 and 17. As a result, D, the phase shift caused by the path difference due to the near field placement of the probe, should be confined to within 0 radians and $\pi$ radians. To accomplish this, L, the path difference, has to be greater than zero and yet less than half the wavelength of the received signal. To insure that this is true for the entire frequency band of interest, the smallest wavelength (highest frequency) must be used. The restriction on L then becomes:

$$0 < L < c/(2F) \qquad (23)$$

where F is the maximum frequency of the desired band.

$K_D$, $K_S$, $T_D$, and $T_S$ thus help to specify the location of probe 23 relative to the position of elements 50 and 51, which could be, for example, elements AA and BB. The same formulas can be used to restrict the location of the probe relative to the positions of elements CC and DD, AA and CC, and BB and DD.

Probe positioning can be simplified if two separate probes, an azimuth probe and an elevation probe, are used to generate the azimuth and elevation error signals, respectively.

The analysis of the near field induced phase angle errors in the azimuth channel can be simplified by locating the azimuth error probe in the elevation plane. (FIG. 2(a) illustrates the intersection of the elevation plane with the plane of FIG. 2(a)). Elements AA and CC as shown in FIGS. 2(a) and 2(b) will then be equidistant from the azimuth error probe. This insures that the signals from elements AA and CC are in phase. These signals could then be treated as if they were from a single element. Similarly, the signals from elements BB and DD can be treated as if they were from a single element since their signals are also in phase. This simplifies the four element configuration to the two element case shown in FIG. 3.

Similarly, the analysis of the near field phase angle errors of the elevation signal can be simplified by locating the elevation error probe in the azimuth plane. (FIG. 2(a) illustrates the intersection of the azimuth plane with the plane of FIG. 2(a)). This insures that the signals from elements AA and BB as well as the signals from elements CC and DD are in phase. This again simplifies the four element configuration into a two element case as shown in FIG. 3.

In some tracking systems the azimuth and elevation signals are multiplexed together. This requires a multiplexer and a demultiplexer but it allows the azimuth and elevation channels to share an amplifier (such as 6 or 7) and a down converter (such as 11 or 12). The azimuth and elevation signals then suffer the same phase shift since they have the same transmission path. In such a situation, only one probe 23 and one near field compensation phase shifter (27 or 28) is necessary, since the phase alignment of one signal will also align the phase of the other signal. The near field compensation phase shifter can be inserted within either the sum channel or the multiplexed error channel. For this multiplexed error signal embodiment, autophase controller 20 requires just one input, from either detector 14 or detector 15.

In some tracking systems the antenna can track only in one direction. In such a case, only one near field compensation phase shifter and one probe is required.

In order for the near field simulated source to be used, the settings of near field compensation phase shifters 27 and 28 have to be initialized the first time they are used in the system. This can be accomplished by first using switches 32 and 33 to remove phase shifters 27 and 28 from the azimuth and elevation signal paths, respectively. A stationary far field source of the desired frequency is then used to phase align the system at the desired frequency by letting autophase controller 20 adjust phase shifters 16 and 17 to maximize the signals from the outputs of detectors 14 and 15, respectively. The near field source, comprising off-boresight-axis but stationary probe 23 and signal generator 22 of the desired frequency, is then substituted for the far field source. Near field compensation phase shifters 27 and 28 are then inserted into the azimuth and elevation signal paths, respectively, by switches 32 and 33, respectively. These phase shifters are then adjusted to achieve maximum signal at the outputs of detectors 14 and 15, respectively. Shifters 27 and 28 are then switched out of the system, and signal generator 22 is disabled, for operation during the normal tracking mode.

If any of the equipment in any of the sum, azimuth, or elevation channels is changed, or the frequency is changed, thus necessitating phase realignment, such subsequent alignments can be done without using a far field source because shifters 27 and 28 have already been initialized. Rather, it is sufficient to provide a suitable signal of the desired frequency from signal generator 22 to probe 23, to insert near field compensation phase shifters 27 and 28 with switches 32 and 33, respectively, to allow autophase controller 20 to adjust phase shifters 16 and 17, respectively, to maximize the signal at the outputs of detectors 14 and 15, respectively. Switches 32 and 33 are then used to remove the near field phase compensators 27 and 28, respectively, from their respective signal paths, and signal generator 22 is disabled. Probe 23 can be removed from the near field of antenna 1 or left in place; the latter is usually more convenient. The system is once again phase aligned and ready for signal tracking operation.

The techniques of this invention can be applied to a Cassegrain fed paraboloidal antenna, for example. If the antenna 1 has a 32 meter diameter main reflector, frequency band between 3700 MHz and 4200 MHz, a subreflector located approximately 215 inches from a feed array comprising five receiving horns as configured in FIG. 2(b), and a distance between adjacent horns of approximately 20 inches, then probe 23 can be positioned on the subreflector approximately 12 inches away from the boresight axis within either the azimuth or elevation plane. For such a probe-to-horn geometry, the average offset of the near field phase compensators 27 and 28 is approximately 15°.

The above description is included to illustrate the operation of the preferred embodiments, and does not limit the scope of the invention. The scope of the invention is to be limited only by the following claims. From the above discussion, many variations will be apparent to one skilled in the art that would yet be encompassed by the spirit and scope of the invention. For example, near field phase compensation can be accomplished without the use of phase shifters 27 and 28: controller 20 can be programmed to add the requisite offsets to phase shifters 16 and 17 after outputs 30 and 31 have been maximized.

Similarly, the outputs of controller 20 can be connected to shifters 27 and 28 rather than to shifters 16 and 17 (because 27 and 16 are in series and 28 and 17 are in series). For the embodiment where the error channels are multiplexed, the output of controller 20 can be connected to the single near field compensation phase shifter that is inserted in either the sum or difference channel.

What is claimed is:

1. An apparatus for phase aligning a steerable directional antenna's tracking system having a reference channel and a first tracking error channel, comprising:
    a probe connected to a radiation signal generator, said probe placed within the near field aperture of the antenna but off of the antenna's boresight axis; and
    a phase shifter switchably placed within one of said channels wherein adjustment of said shifter compensates for phase shifts introduced by the placement of the probe.

2. An apparatus as recited in claim 1 wherein the probe is positioned within a plane prescribed by movement along a first axis.

3. An apparatus as recited in claim 1 wherein the probe is positioned within a plane prescribed by movement along an axis from a group consisting of spatially orthogonal axes.

4. The apparatus of claim 1 wherein the antenna comprises a plurality of receiving elements;
    wherein the probe is positioned within a region where the differences in the path lengths between the probe and any two elements is greater than zero and less than half the minimum wavelength of radiation tracked by said antenna.

5. The apparatus of claim 1 wherein the antenna comprises a plurality of receiving elements;
    wherein the probe is placed so as to limit the variation in the near-field-probe-induced tracking-error-channel phase shifts as a function of frequency within the frequency band of interest.

6. The apparatus of claim 1 further comprising a second tracking error channel and a second phase shifter placed within one of said second tracking error and reference channels for compensating for phase shifts introduced by placement of the probe;
    wherein one tracking channel represents the antenna's pointing error with respect to a first axis and the other tracking channel represents the antenna's pointing error with respect to a second axis spatially orthogonal to the first axis.

7. The apparatus of claim 1 wherein the tracking error channel contains a multiplexed composite of the antenna's error signals proportional to pointing errors with respect to each of two orthogonal axes.

8. An automatic phase alignment system for a steerable tracking antenna comprising:
    an error channel for communicating a signal proportional to the augular difference between the antenna's boresight axis and the direction of an incoming signal;
    a first phase shifter having a first input connected to an output of the error channel;
    a detector having a first input connected to an output of the phase shifter;
    a reference calibration source connected to a second input of the detector;
    a controller having an input connected to an output of the detector and an output connected to a control input of the phase shifter, wherein the controller monitors the output of the detector and automatically adjusts the phase shifter to maximize the signal from the detector.

9. The apparatus of claim 8 further comprising:
    a probe located within the antenna's near field but off the antenna's boresight axis and connected to a radiation source; and
    a second phase shifter switchably inserted within one of said error channel and calibration source for compensating for phase deviations introduced by the placement of the probe.

10. An automatic phase alignment system for the tracking network of a steerable antenna having a first error channel, a second error channel, and a reference channel, wherein said first and second error channels represent tracking errors with respect to each of two orthogonal axes, comprising:
    a first calibration source which inserts a first calibration signal onto the first error channel;
    a second calibration source which inserts a second calibration signal onto the second error channel;
    a first alignment phase shifter having a control input and a signal input, wherein the signal input is connected to an output of the first error channel;
    a second alignment phase shifter having a control input and a signal input, wherein the signal input is connected to an output of the second error channel;
    a first error channel detector having a first input connected to an output of the first alignment phase shifter, and a second input connected to an output of the reference channel;
    a second error channel detector having a first input connected to an output of the second alignment phase shifter, and a second input connected to said reference channel output; and
    an autophase controller having a first input connected to an output of the first error channel detector, a second input connected to an output of the second error channel detector, a first output connected to the control input of the first alignment phase shifter, and a second output connected to the control input of the second alignment phase shifter;
    wherein the autophase controller adjusts the first and second alignment phase shifters to respectively maximize the outputs of the first and second error channel detectors.

11. An automatic phase alignment system for a steerable directional antenna having an azimuth error channel, an elevation error channel, and a reference channel, comprising:
    an electromagnetic radiation signal generator;
    at least one probe connected to the signal generator, said probe placed in the antenna's near field within the aperture of the antenna but off the antenna's boresight axis;
    an azimuth near-field phase shifter switchably inserted within the azimuth error channel to compensate for azimuthal phase shifts introduced by probe placement;
    an elevation near-field phase shifter switchably inserted within the elevation error channel to compensate for elevational phase shifts introduced by probe placement;

an azimuth alignment phase shifter having a control input and a signal input, wherein the signal input is connected to an output of the azimuth error channel;

an elevation alignment phase shifter having a control input and a signal input, wherein the signal input is connected to an output of the elevation error channel;

an azimuth error channel detector having a first input connected to an output of the azimuth alignment phase shifter, and a second input connected to an output of the reference channel;

an elevation error channel detector having a first input connected to an output of the elevation alignment phase shifter, and a second input connected to said reference channel output; and an autophase controller having a first input connected to an output of the azimuth error channel detector, a second input connected to an output of the elevation error channel detector, a first output connected to the control input of the azimuth alignment phase shifter, and a second output connected to the control input of the elevation alignment phase shifter;

wherein the autophase controller adjusts the azimuth and elevation alignment phase shifters to respectively maximize the outputs of the azimuth and elevation error channel detectors.

12. An automatic phase alignment system for a tracking antenna having a reference channel and a multiplexed error channel for conveying signals representative of antenna pointing errors with respect to two orthogonal axes, comprising:

an electromagnetic radiation signal generator;

a probe, connected to the signal generator, placed in the near field aperture of the antenna, but off of the antenna's boresight axis;

a near-field compensation phase shifter switchably inserted into one of said channels to compensate for phase shifts introduced between the probe and said shifter; and a demultiplexer having an input connected to an output of said error channel, a first output containing an error signal representative of the antenna's pointing error with respect to said first axis, and a second output containing an error signal representative of the antenna's pointing error with respect to said second axis.

13. The system of claim 12 further comprising:

a first-axis error signal detector having a first input connected to said first-axis error signal via a first-axis phase shifter and a second input connected to an output of said reference channel;

a second-axis error signal detector having a first input connected to said second-axis error signal via a second-axis phase shifter and a second input connected to said reference channel output; and an autophase controller having an input connected to an output of one of said error signal detectors, and further having an output connected to one of said phase shifters.

14. A method for automatically phase aligning the tracking system of a steerable antenna having a reference channel, at least one tracking error channel, and one coherent detector per error channel connected to outputs of each of said reference and tracking channels, comprising the steps of:

inserting a near-field phase compensator into at least one channel;

supplying a calibration signal to a probe positioned within the near field aperture of the antenna but off the antenna's boresight axis so as to induce calibration signals in the reference and tracking channels; and activating an autophase controller connected to a phase shifter associated with each detector, each shifter being connected to a tracking error channel, said controller automatically adjusting each phase shifter so as to maximize the detected amplitude of the tracking error signal associated with said shifter.

15. A method for calibrating the tracking circuitry of a steerable directional tracking antenna, comprising the steps of:

inserting a radiation source within the near-field aperture of said directional antenna but off the antenna's boresight axis, said radiation source transmitting radiation within the frequency range of said directional antenna;

receiving said transmitted radiation by at least two receiving elements disposed to accept the signal to be tracked by said antenna;

generating an error signal from said received radiation, said error signal being proportional to the angular difference between the antenna's boresight axis and the path connecting said transmitting antenna and one of said receiving elements;

detecting said error signal; and phase shifting said error signal to maximize the amplitude of the detected error signal.

16. The method of claim 15 wherein said phase shifting is performed by a phase shifter, and further comprising the step of:

initializing said phase shifter by activating transmitting means in the tracking antenna's far field and along the tracking antenna's boresight axis in lieu of activating said radiation source, and adjusting said phase shifter so as to maximize the detected error signal.

* * * * *